United States Patent Office 2,712,006
Patented June 28, 1955

2,712,006
DISAZO DYESTUFFS

Fritz Suckfull, Leverkusen-Wiesdorf, and Klaus Böckmann, Leverkusen-Bayerwerk, Germany, assignors to Farbenfabriken Bayer Aktiengesellschaft, Leverkusen, Germany, a corporation of Germany No Drawing. Application March 26, 1952,
Serial No. 278,734

Claims priority, application Germany April 9, 1951

5 Claims. (Cl. 260—175)

The present invention relates to new disazo dyestuffs and to a method of making the same; more particularly it relates to disazo dyestuffs corresponding to the following general formula:

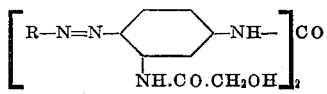

In this formula R stands for the radical of a diazo component of the benzene or naphthalene series.

The new disazo dyestuffs can be obtained by coupling diazo compounds of the benzene or naphthalene series with 1-amino-3-glycolylamino-benzene and converting the aminomonoazo dyestuffs thus obtained into the corresponding ureas by customary methods. In the simplest way this is done by condensing the aminomonoazo dyestuffs with phosgene. The diazo components used contain at least one water-solubilizing group, e. g. sulfonic and/or carboxylic acid group, and may contain further substituents as are used in diazo components. The new disazo dyestuffs dye cotton and fibres of regenerated cellulose essentially yellow shades of very good dischargeability. In this property, especially in the alkaline dischargeability, they excel the comparable known dyestuffs in the synthesis of which 1-amino-3-acetyl-aminobenzene was used, instead of 1-amino-3-glycolyl-aminobenzene of the present invention.

1-amino-3-glycolylamino-benzene used as coupling component in making the new disazo dyestuffs may be obtained by exchanging halogen for hydroxyl in 1-nitro-3-ω-chloroacetyl-amino-benzene by a treatment with alkaline agents and subsequently converting the nitro group into the amino group; or by heating 1-nitro-3-amino-benzene with polyglycolide to about 150° C. under addition of a small quantity of concentrated sulfuric acid and subsequently converting the nitro group into the amino group.

The following examples illustrate the invention without, however, limiting it thereto, the parts being by weight:

Example 1

303 parts of 2-aminonaphthalene-4.8-disulfonic acid are diazotized in the usual manner. A solution acid with acetic acid of 166 parts of 1-amino-3-glycolylamino-benzene is run into the diazo solution, and the excess mineral acid is neutralized with sodium acetate. When coupling is complete, the aminoazo dyestuff is filtered off and dissolved as neutral solution. By introducing phosgene into this solution the aminoazo dyestuff is converted in the usual way into the urea. When unreacted aminoazo dyestuff can no longer be detected, the urea is filtered off and dried. The disazo dyestuff thus obtained is an orange-yellow powder which is easily soluble in water. It dyes cotton and fibres of regenerated cellulose reddish yellow shades which show a very good neutral and alkaline dischargeability.

Example 2

207.5 parts of 1-amino-4-chlorobenzene-3-sulfonic acid are diazotized in the usual manner and coupled in acetic acid medium with 166 parts of 1-amino-3-glycolylaminobenzene. The aminoazo dyestuff is converted into the urea according to Example 1 by means of phosgene. The disazo dyestuff thus prepared is a yellow powder which is easily soluble in water. It dyes cotton and fibres of regenerated cellulose yellow shades of very good neutral and alkaline dischargeability.

Example 3

187 parts of 1-amino-4-methylbenzene-3-sulfonic acid are diazotized in the usual manner and coupled in acid medium with 166 parts of 1-amino-3-glycolylaminobenzene. The aminoazo-dyestuff is converted into the urea as stated in Example 1 by means of phosgene. The disazo dyestuff thus prepared is a yellow powder easily soluble in water. It dyes cotton and fibres of regenerated cellulose clear yellow shades of very good neutral and alkaline dischargeability.

We claim:

1. Disazo dyestuffs corresponding to the general formula:

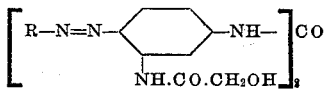

in which formula R stands for a member of the group consisting of radicals of the benzene and naphthalene series containing at least one aromatically-bound water-solubilizing group, said dyestuffs dyeing cotton and fibres of regenerated cellulose essentially yellow shades.

2. The disazo dyestuff corresponding as free acid to the formula:

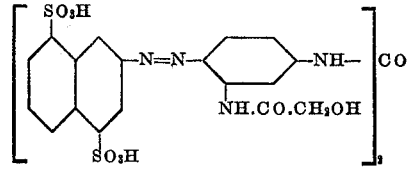

said dyestuff dyeing cotton and fibres of regenerated cellulose reddish yellow shades of very good dischargeability.

3. The disazo dyestuff corresponding as free acid to the formula:

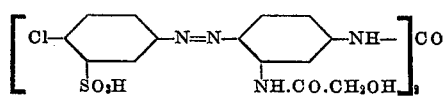

said dyestuff dyeing cotton and fibres of regenerated cellulose yellow shades of very good dischargeability.

4. The disazo dyestuff corresponding as free acid to the formula:

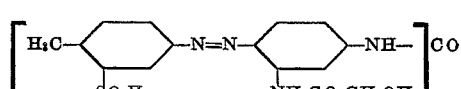

said dyestuff dyeing cotton and fibres of regenerated cellulose clear yellow shades of very good dischargeability.

5. Compounds of claim 1 wherein the water-solubilizing groups are sulfonic acid groups.

References Cited in the file of this patent

UNITED STATES PATENTS 2,273,094    Fischer et al. _____ Feb. 17, 1942